United States Patent [19]

Stemmle

[11] 3,997,263

[45] Dec. 14, 1976

[54] BI-DIRECTIONAL COPIER OUTPUT

[75] Inventor: Denis J. Stemmle, Williamson, N.Y.

[73] Assignee: Xerox Corporation, Stamford, Conn.

[22] Filed: Sept. 22, 1975

[21] Appl. No.: 615,317

[52] U.S. Cl. .................................. 355/24; 355/51; 271/64

[51] Int. Cl.[2] .................. G03B 27/52; G03B 27/70; B65H 29/58

[58] Field of Search .................. 355/24, 50, 51, 66, 355/16, 65; 271/64, 172, 173

[56] References Cited

UNITED STATES PATENTS

| | | | |
|---|---|---|---|
| 3,700,231 | 10/1972 | Aasen et al. | 271/64 |
| 3,848,868 | 11/1974 | Stemmle | 271/173 |
| 3,948,505 | 4/1976 | Miller et al. | 271/64 |

OTHER PUBLICATIONS

Avritt, IBM Technical Disclosure Bulletin, vol. 18, No. 7, Dec. 1975, Two–module Collator.

*Primary Examiner*—L. T. Hix
*Assistant Examiner*—Steven M. Pollard

[57] ABSTRACT

In a copier in which a document handling system alternatingly recirculates documents in forward serial order and then in reverse serial order relative to the optical imaging system to provide bi-directional pre-collated copying in which the copies form copy sheet sets which are alternately in forward and reverse serial order. Two copy sheet bins collect alternate copy sheet sets via a copy sheet output control which alternatingly switches the path of the copy sheets between these two bins in response to the switching between the forward and reverse serial order of copying of the documents. The first bin provides face-up stacking of the copy sheets to re-establish forward serial order collation and the second bin provides face-down stacking to maintain forward serial collation, cooperatively with the copy sheet output control.

14 Claims, 2 Drawing Figures

BI-DIRECTIONAL COPIER OUTPUT

Figure 1:
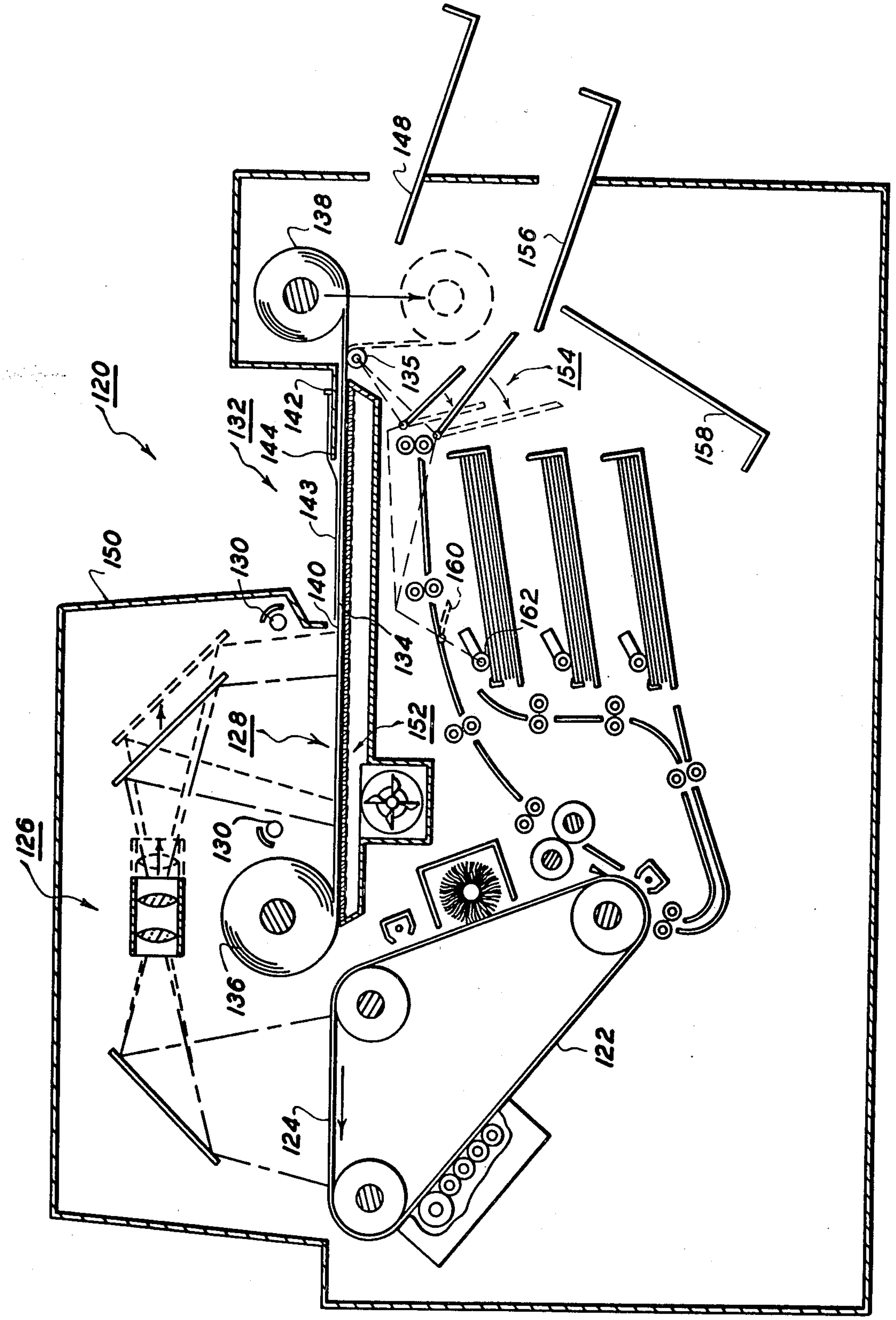

This application is related to a commonly assigned pending U.S. Pat. application Ser. No. 560,755, filed Mar. 24, 1975, by the same Denis J. Stemmle entitled "Precollation Copying" [D/73515]. The disclosure thereof, and the prior art reference cited therein, are incorporated by reference in this application. The Commissioner's notice of May 19, 1975, published June 17, 1975, is noted.

The present invention relates to bi-directional pre-collation copying systems, and more particularly to a copy sheet output handling system therefor for providing properly collated copy sheet sets.

When multiple copies are made from a multi-page set of original documents, the multi-page copies thereof must be separated into separate copy sets in proper order, which is known as collation. For example, for ten copies of a five page document set the copies should end up in ten separate copy sets, each copy set having one copy of pages 1 through 5 therein, in that order. For duplex copies that two of the document pages may be copied on opposite sides of the same copy sheet, which makes collation more difficult. Once the copies are collated into copy sets they can then be stapled, bound, or otherwise finished. Such a copy set may be a copy of a multiple page memo, report, brief, magazine, book, etc.

The collation of multiple copy sets is known to be performable manually or automatically, in two general ways. In one way, which may be called "post-collation," the original document pages need only be handled once for copying. All of the desired number of copies are made in one copying operation from each document page. The copies thus come out of the reproducer in uncollated form, e.g., 10 copies of page 1 together, followed by 10 copies of page 2, etc. The postcollation can then be provided in a number of well known ways by mechanical sorters or collators, which separate the copy pages into separate copy set bins. Each copy sheet of a given document page must be individually placed in a separate bin. Then the copy of the next document page must be placed adjacent the preceding copy page in each bin until a copy set is completed in each bin.

The conventional post-collation process has a number of disadvantages. It requires considerable mechanical handling of the copy sheets, which consequent potential jams and copy sheet loses. The sorters or collators require considerable space, weight, and expense in order to provide a sufficiently large capacity. A conventional sorter or collator has a limited maximum capacity for the number of copy sets, equal only to the number of its bins. Thus, a single 20 bin sorter can only collate for 20 copies of a document set and additional copies would be uncollated unless recopying, with document recirculation, is provided, or unless "limitless" sorting is provided by switching between two or more bin sets and unloading them during the copying run. Also, the maximum size of the copy sets, including the maximum number of copy sheets which can be in each copy set, is limited by the size of the individual bins.

The use of sorters or collators can be completely avoided by "pre-collation," a different way of performing output collation. In pre-collation the originals are serially recirculated, and one copy made per page per recirculation, by the number of times corresponding to the number of copies desired. Thus, the copy sheets come out of the reproducing apparatus individually, but already pre-collated into order, i.e., in sets. Another term for a pre-collation system is a "document recirculation system," since the documents must be recirculated in some manner in order to allow their repeated sequential copying. Stating it another way, one copy at a time is made from the originals, one original page at a time, in forward or reverse page sequence, until the original document set has been fully copied. Then this copying sequence of the document set is repeated by the number of times corresponding to the desired number of copies of the document set. Thus, for the exemplary 10 copies of a 5 page book, one copy at a time would be made of each document page in this order: pages 1, 2, 3, 4, 5; 1, 2, 3, 4, 5, etc., repeated a total of ten times to make 10 copy sets. However, for bi-directional precollation copying, to which the present invention relates, the copying sequence would be 1, 2, 3, 4, 5; 5, 4, 3, 2, 1; 1, 2, 3, 4, 5, etc., i.e., the copying switches alternately between forward and reverse serial order.

In pre-collation copying, all copies may be collated in one or two large output trays rather than in multiple bins. A relatively simple off-setting or staggering device may be provided for the output tray, if desired, to displace each copy set slightly from the next, for set recognition and separate removal. E.g., U.S. Pat. No. 3,630,607 issued Dec. 28, 1971, to H. Korn et al., U.S. application Ser. No. 319,839, filed Dec. 29, 1972, by Denis J. Stemmle is also noted in this regard, in a web scroll post-collation system.

With pre-collation copying, there is no limit on the number of copy sets. Operator unloading is not required. The side of each copy set is limited only by the document page capacity of the document recirculation system. Completed sets can be removed from the output tray while the others are still being produced. A complete first set is produced from the first copies, and is immediately usable for proofing. On-line finishing can be provided in which each copy set is bound while the next set is being produced. U.S. Pat. Nos. 3,793,016 and 3,794,550 issued Feb. 19, and Feb. 26, 1974, are noted for a finishing system. They both state that, "It is especially suitable for direct on-line binding of pre-collated output sets from high speed machines." Job recovery (replacement of copy sheets lost by jams or misfeeds) is simplified with pre-collation since only the one copy set in which pages are lost need be corrected.

The embodiments disclosed herein utilize a preferred pre-collation system in which document recirculation for multiple serial copying is provided while retaining document sheets on an elongate web wound in document retaining storage scrolls for minimizing document handling and maximizing document protection, where the web is wound and unwound between these document retaining scrolls for the pre-collation document copying. However, it will be appreciated that other bi-directional copying systems may also utilize the present invention and, therefore, it is not limited thereto. Examples of other bi-directional document movement copying systems are disclosed, for example, in U.S. Pat. No. 3,574,459, issued Apr. 13, 1971, to K. Hartwig and in U.S. Pat. application Ser. No. 552,003, filed Feb. 24, 1975, by D. O. Kingsland [D/75076].

In the automatic document handling system for making pre-collated copy sets disclosed herein, and in more detail in the above-cited parent application, the repeated collated imaging of a set of original documents is provided by placing and retaining the documents on an elongate windable document holding web. This web is wound between two spaced web scrolls positioned and wound so as to retain the document between the turns of the web scrolls on both of the scrolls. The web is repeatedly wound and unwound from one scroll to the other (recirculated) to repeatedly expose individual documents on the web in an exposed portion of the web extending between the scrolls. The documents are optically exposed on the web between the scrolls for copying, and a simple optics arrangement may be utilized.

The documents in the presently disclosed system need not contact any other object than the retaining web itself and are held between the layers of the web scroll. Thus, there is no substantial relative motion required at any time between a document sheet and any other object, even during recirculation. This reduces the danger of document damage greatly.

In the disclosed system, the advantage of manual initial document placement can be provided, or automatic initial document loading may be provided. Yet once the documents are placed on the web, all of the subsequent recirculations of the documents for pre-collation copying may be accomplished by the system itself without manual intervention. Further, the unloading of the documents can also be automatically accomplished. Thus, all of the advantages of pre-collation copying noted above can be provided, yet with minimization of document handling disadvantages. Further, the present system is readily compatible with various automatic separating and loading systems, and only a single separating and loading operation need be performed on each document regardless of the number of copies.

As noted above, the size of individual pre-collated copy sets is limited only by the document capacity of the recirculation system. With the system disclosed herein a large number of documents can be recirculated. This number is limited only by the desired or practical maximum dimensions of the web scrolls.

Considering now additional background, as previously noted the concept of fully manual pre-collation copying is well known, in which an operator sequentially manually makes single copies of the pages of a document set and recopies the set by the number of copy sets desired. Some examples of previously known automatic pre-collation copying systems for document sheets are disclosed in U.S. Pat. No. 2,822,172, Feb. 4, 1959, by C. R. Mayo et al., German Pat. No. 1,128,295, Oct. 25, 1962, by H. Rankers; and U.S. Pat. Nos. 3,499,710, by L. W. Sahley, 3,536,320, by D. R. Derby (also teaching a vacuum feed belt) and 3,799,537, by H. W. Cobb. In the latter the documents are recirculated in individual carriers.

The present invention is also applicable to duplex copiers, i.e., copiers copying on both sides or faces of a copy sheet as opposed to single side or simplex copying. Duplexing may be carried out manually by restacking the copy sheets after copying on the first side, and then placing them in a sheet feeder supply tray for copying on the second side, or it may be carried out automatically by various means as, for example, the use of an auxiliary or duplex feeder tray such as in the Xerox "4000" copier. Some examples of duplex copying systems are disclosed in U.S. Pat. Nos. 3,615,129; 3,645,615; 3,841,754; 3,844,653; and the references cited therein.

One of the problems which occurs with reproducing machines when they do both simplexing and duplexing is the generation of improperly collated sets of copy sheets in the output tray. For simplex unidirectional copying proper collation can be obtained by properly orienting an output path and output tray so that if sheets 1 through 10 are copied serially in the forward order, 1 through 10, they will appear face down in the output tray in that order. Numerous sorter/collator type devices have been devised which are capable in a simplex mode of operation of providing properly collated sets of copies. However, when one performs duplex copying the resulting copies of the documents 1 through 10 may be initially improperly collated and appear in the page order 2, 1; 4, 3; 5, 4, etc..

One approach to solving this duplex output problem is set forth in IBM Technical Disclosure Bulletin, Vol. 14, No. 5, October, 1971, at page 1453. A duplexing copier is disclosed which incorporates a sorter collator which has feed paths which ensure that the sheets having printed matter on only one side are deposited in collator bins with the printed matter facing down, while sheets having printed matter on both sides are deposited with the last side copied facing up. This is accomplished using a sorter collator having two rows of back-to-back bins. One row is for receiving sheets copied on one side, and the other row for receiving sheets copied on both sides. Diverters are used to direct the sheets to the appropriate transports for depositing in the selected row and bin depending on whether they were simplex or duplex copied.

Other examples of selectable simplex/duplex sorter collators for maintaining collation are disclosed in U.S. Pat. Nos. 3,750,880 issued Aug. 7, 1973, to P. Petrovsky, et al.; 3,866,904, issued Feb. 18, 1975, to D. J. Stemmle; and 3,833,911 issued September 3, 1974, to J. R. Caldwell, and D. J. Stemmle; and in U.S. application Ser. No. 455,467 filed Mar. 28, 1974, by Joachim Guenther (D/73073). The sheet deflector or invertor structures shown in these references may be incorporated herein as alternative embodiments of structures for providing the face-up versus face-down output selection for the present invention.

Exemplary embodiments of the present invention are shown and described hereinbelow as incorporated into otherwise conventional exemplary xerographic apparatus and processes. Accordingly, said xerographic apparatus and processes themselves need not be described in detail herein, since various printed publications, patents and publicly used machines are available which teach details thereof to those skilled in the art. This includes the use of flat platen scanning optics systems for copiers. Some examples of such optics systems are disclosed in U.S. Pat. No. 3,775,008, issued Nov. 27, 1973, and 3,832,057 issued Aug. 27, 1974, and in their cited references. Structures and teachings from these and all of the other references cited herein may be incorporated by reference in this specification, to the extent appropriate.

Figure 2:
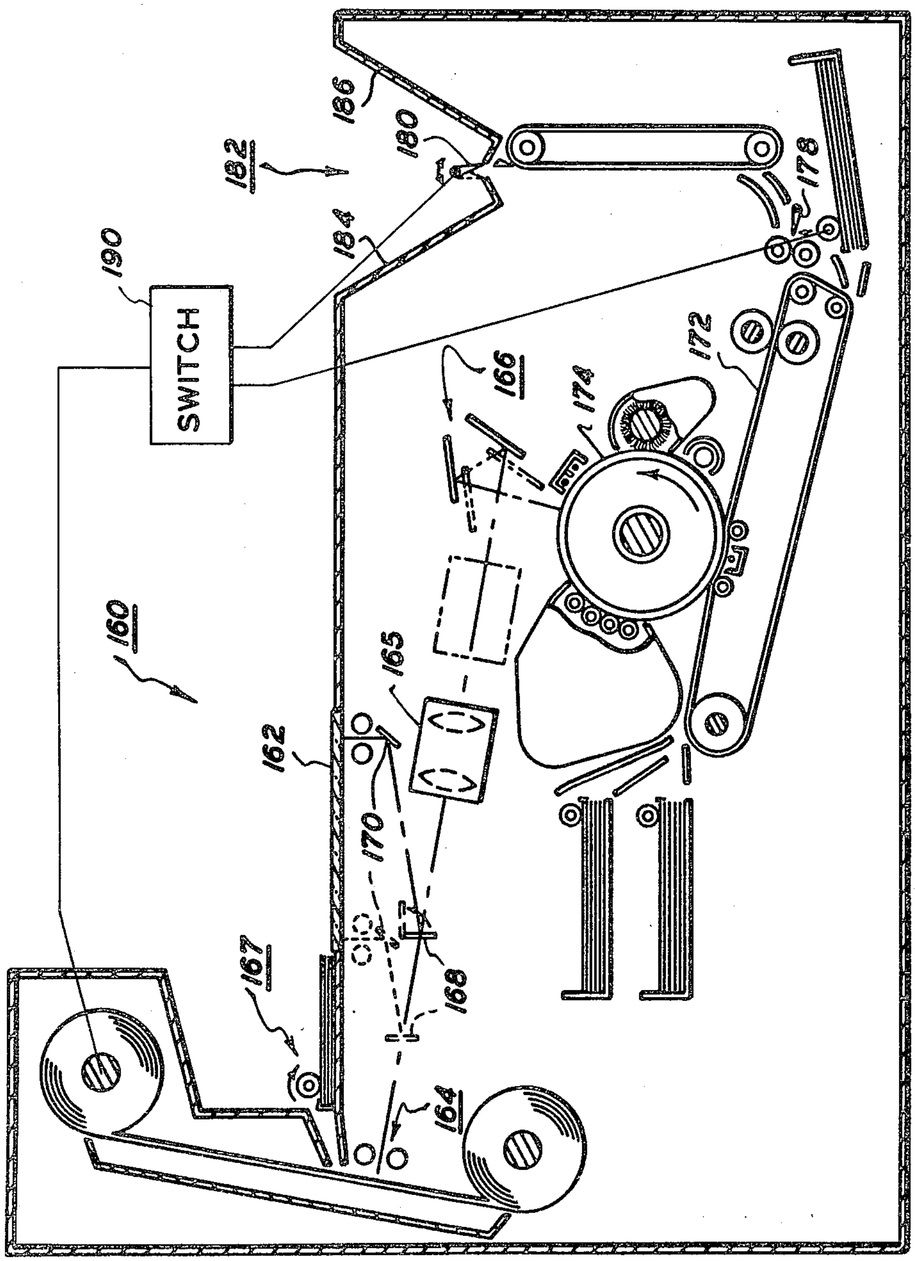

Further objects, features and advantages of the present invention pertain to the particular apparatus, steps, and details whereby the above-mentioned aspects of the invention are attained. Accordingly, the invention will be better understood by reference to the following description and to the schematic drawings forming a part thereof, which are approximately to scale except where otherwise noted, and wherein:

FIG. 1 is a schematic side view of a bi-directional xerographic copying system with collated copy sheet output in accordance with the present invention; and FIG. 2 is a side view of a second embodiment in accordance with the present invention.

Referring now to the drawings, FIGS. 1 and 2, there are illustrated therein two different embodiments only as examples of the present invention. In these embodiments the automatic document handling systems have different orientations and combinations with different exemplary xerographic (or other electrostatographic) copying systems, and different output arrangements. It will be appreciated that the present invention may also be utilized with the other embodiments disclosed in the parent application. All of these embodiments provide automatic pre-collation document copying as described above in the background discussion.

In both of the embodiments shown herein it may be seen that the documents are loaded upon, and automatically recirculated by, an elongate windable document holding web such as is illustrated in FIG. 2. Means are provided for forming a spaced pair of oppositely wound scrolls from this web for winding up the documents loaded onto the web into these scrolls. The documents are retained between the turns of the web on both of the scrolls during the copying operation. It may be seen that the web has a minor intermediate unwound segment extending between the two web scrolls where the documents are exposed for copying by appropriate conventional optical imaging means. The document imaging means projects the document images onto a xerographic drum or belt or other imaging surface. Appropriate or conventional drive means are provided for recirculatingly winding and unwinding the web between one web scroll and the other so as to recirculatingly expose, in sequence, the individual documents on the web as they appear on the unwound intermediate web segment. The documents are thereby exposed in the pre-collated order in which they are loaded onto the web, and in the inverse order, and thus correspondingly pre-collated copy sets can be produced by the web bi-directional recirculations between the scrolls. As the documents are loaded they are wound up on the web into one of the scrolls so that the documents are trapped between the web layers of the scroll. Likewise, when the web is recirculated onto the other scroll the documents may be retained in position solely by being held between the layers of the other scroll. The documents may each be exposed as they are being loaded to provide a "proof set."

In the intermediate web segment between the scrolls the documents are preferably held in position on the web by providing a web with an air permiable structure and by providing a vacuum platen and vacuum chamber on the opposite side of the web from the document retaining side. The porous web and the exposed document thereon are thereby held against the vacuum platen within the span region of the web between the scrolls. The retaining of the documents on the web in the exposed inner-scroll segment is also assisted by providing a substantially linear and planar configuration of the web between the two scrolls.

It is important to note that all of the scrolls illustrated in the Figures are oppositely wound and convoluted and allochiral. The intermediate segment of the web forms a document retaining nip on its document retaining side with each of the scrolls where the web winds into the scrolls, i.e., both of the nips are on the document retaining side of the web. Further, both of the scrolls are on the document retaining side of the web in their document recirculating position. This insures that the documents are maintained on the web on its document retaining side continuously, and that the documents are maintained only in a concave orientation on both of the scrolls (concave relative to the side of the documents being imaged).

Referring to the document retaining web, one example is a thin, flexible, but substantially non-stretching Mylar plastic or other suitable web material, highly perforated over its major central portion to render it air permiable. Its outer edges, at each side thereof, may be unperforated edges driven by driven friction rollers. The air permiable main portion of the web may be covered by a thin layer of high friction material on the document carrying side of the web. It also provides the optical background against which the document is optically imaged. The surface of the web provides a high friction surface relative to the document to prevent document movement or sliding on the surface of the web.

Reviewing now the operator activities for both embodiments, the operator loads the original documents one at a time in forward serial order (pages 1, 2, 3, etc.) onto the document web. The web is advanced from the scroll 50 toward the scroll 52 upon the loading of each document. As that occurs, each document is carried past the exposure station and a copy is made therefrom through the optics system. Thus, a copy is made of each original while that original is being loaded. Thereby, upon the completion of loading of all of the originals onto the web, a proof set is already available at the copy output tray. The operator may check this proof set to insure that all of the documents have been located on the web in their proper position and orientation, and that the entire apparatus is operating correctly, prior to making the remainder of the desired number of copy sets.

At the completion of document loading here all of the documents will have been wound up into the downstream scroll and be retained therein. To make any desired number of copy sets the operating merely selects appropriate conventional switches to initiate the copying automatically. The web is repeatedly recirculatingly wound and unwound between the scrolls by the number of times corresponding to the number of copy sets desired. On each copying recirculation the entire series of documents is moved past the imaging area on the web and individually copied.

The copying is done in the line scanning or flowing light strip imaging system of FIG. 2 so as to provide document image movement in the same direction as the illustrated photoreceptor drum movement direction. To avoid a high speed rewind to rewind the web back from one scroll onto the other scroll before each web copying run, bi-directional scanning is provided by inserting an appropriate optical system 165 in the optics path there to optically reverse the apparent scanning direction on alternate web direction movements. Examples of such systems have been cited hereinabove.

A complete individual pre-collated copy set is produced from each recirculation of the web between the scrolls carrying the documents thereon, without requiring a collator or sorter. As previously described in the introduction, the operator may provide on-line stapling or finishing either automatically or manually while the machine is continuing to make the subsequent copy sets automatically.

The documents are supported solely by the web and do not need to contact any other structure during their recirculation and copying.

A copy sheet inverter is provided so as to selectively allow "face down" or "face up" output of copy sheets onto the top of the copy sheets output tray or trays, thereby maintaining proper forward serial collation. The copy sheet output inverter may be any of the several well-known types, or those illustrated herein.

The extent or length of the reciprocal winding and unwinding of the web between the two scrolls will vary depending on the number of documents being copied, their dimensions, and the spacing which is provided between documents on the web. The machine logic may record the length of web utilized in loading the given number of documents, so that the web need only be recirculatingly driven by this length for each copy set. Alternatively, various document presence or absence sensing devices, optical or mechanical, as are well known in the art, may be utilized to detect the number and/or position of documents which have been loaded onto the web. It will also be appreciated that in the loading of documents that the incremental advance which is provided to the web upon the loading of each document may be varied in length, depending on the size of the document and the desired space between it and the next document. This incremental web advance upon loading may be pre-set in the web drive mechanism or may depend on sensing devices for sensing the position of the document edges in the direction of web movement. For copying of duplex (two sided) originals, the odd sides may be loaded face up and copied, and the documents removed and turned over and reloaded for copying their even sides. A blank space may be left on the web for a simplex original intermixed with duplex originals, if desired, or the web sequenced instead.

Referring now specifically to FIG. 1, there is shown an embodiment 120. Its xerographic processor comprises a flexible photoreceptor belt 122 and associated processing stations. This type of xerographic processor is disclosed in the Xerox Corporation "9200" high-speed xerographic duplicator and in patents thereon. Accordingly, it details need not be described herein.

The configuration of the photoconductive belt 122 provides a full frame planar imaging area 124 thereon. This allows the use of a simplified optics system 126 in which the entire document is imaged at once at an imaging station 128. Illumination is preferably provided substantially instantaneously, so as to "stop" document movement, by a flash lamp illumination system 130. This full frame image is then reflected as shown through two large stationary mirrors and a lens onto the belt imaging area 124. Dashed outline positions of the two mirrors and the lens are shown to illustrate alternative positions for variable magnification of the document. Variable magnification refers primarily to variable reduction of the document image on the final sheet.

Referring now to the automatic document handling system 132 of FIG. 1, the document web 134 and the scrolls 136 and 138 are shown in their copying or document recirculating position. This is also the document loading position. The disclosed exemplary document loading arrangement and operation for loading documents onto the intermediate segment 140 of the web 134 will now be described although it may be seen that other manual, or automatic document loading may be utilized instead. An exemplary document 143 is shown in the loading position. It may be seen there is a document loading edge stop 142 substantially spaced from the imaging station 128. Also, there is a connecting document support surface 144 extending from the document edge stop 142 toward the web 134. A portion of the web intermediate segment 140 adjacent the support surface 144 provides a document loading and support area in combination therewith. The support surface 144 is closely spaced above the web 134 here. The document edge stop 142 provides registration of the rear edge of the document 143 being loaded onto the web 134, while the opposing or forward edge of the same document 143 is being simultaneously directly placed on the intermediate segment 140 of the web 134. The support surface 144 provides sufficient support of the rear portion of the document off of the web to allow manual readjusting or correct positioning of the document as it is being loaded against the edge stop 142. The edge stop 142 extends linearly at right angles across the web 134. Thus, the documents may be fully manually registered and loaded on the web without any significant skew of the document relative to the direction of movement of the web. The web movement during loading will pull the document away from the edge stop 142 rather than drive the document against it. The edge stop 142 may be a simple fixed upstanding surface or lip relative to the support surface 144. It does not need to be retractable or movable in any manner.

As soon as the operator releases his hand from the document 143 and causes the web to advance, the vacuum and gravity attraction to the web 134 of that portion of the document which is resting on the web (rather than on the support surface 144) will carry the document off on the web 134 directly into the imaging station 128, with the trailing portion of the document sliding off of the support surface 144 onto the web and away from the edge stop 142.

The edge position of the document may be registered or known by the machine logic relative to the web position if the web is stopped during each document loading. The document position on the web is then known for registraion purposes by the machine logic for its subsequent recirculating copying at the imaging station 128.

Various automatic document unloading arrangements for documents on the web 134 may be provided. Illustrated here is an unloading arrangement wherein the scroll 138 has moved downwardly to arcuately loop web 134 around a supporting roller 135 to provide automatic stripping of documents into a document catch tray 148 upon the winding up of the web 134 into the scroll 138. This is the same basic arrangement as previously described in other embodiments above.

Referring now to the imaging of documents which have been loaded onto the web 134, it may be seen with the arrangements shown that a light shield 150 is provided to enclose the imaging station 128 and the illumination from the flash lamps 130 within the apparatus 120. The document edge stop 142 is outside of and substantially spaced from the light shield 150 so that the entire document loading area is in full view and freely accessible by the operator. Yet the web 134 passes immediately from this document loading area into the imaging station 128 under the edge of the light shield 150, which extends toward, but is closely spaced from, the intermediate segment 140 of the web. An immediate "proof set" copy can be initiated as each document is loaded. In effect, the light shield 150 divides the web intermediate segment 140 into two portions, one of which is outside the light shield for document loading (with light shielding) and the other of which is within the light shield for imaging of the documents. Both of these portions of the intermediate segment 140 are in the same plane and utilize the same or similar vacuum system 152 applying a vacuum therethrough. The entire intermediate segment 140 has a desirable horizontal and upwardly facing orientation.

An advantage of the zenon flashlamp 130 simultaneous imaging of the full document is that this type of illumination effectively optically "stops" the image like a high-speed camera even though the document may be moving quite rapidly on the web 134. Thus, the web 134 during copying may be continuously moved between the scrolls in either direction, i.e., the documents may be copied as they pass through the imaging station 128 from either direction. There is no problem with maintaining proper scanning direction and speed coordination with the photoreceptor belt 122, unlike the slit scanning or "flowing light image" systems of other embodiments, which require smooth precise web driving accurately synchronized with the photoreceptor surface movement. However, where such bi-directional document scanning is utilized here, an inverter is needed to invert each page of alternate copy sets.

The output path of the copy sheets in the embodiment of FIG. 1 is from the xerographic processor and fuser through a copy sheet output control 154 into one or the other of two copy sheet out set collection bins or trays 156 and 158. The bin 156 here provides for face-up stacking of copy sheets and the bin 158 here provides for face-down stacking, and for inversion cooperatively with the output control 154. The output control 154 here comprises a jointly movable spaced pair of sheet guide plates forming a movable chute or guide for each sheet as it exits into one of the two bins. The output control 154 here is pivotable between two positions in which it directs sheets into the respective output bins.

It is particularly important to note that in the present invention that the output control 154 is actuated to change output bins in response to the alternation between forward and reverse serial order of copying of the documents, i.e., in response to the direction of movement of the document web 134. This direction of motion can be sensed by various conventional electrical or mechanical switches or other arrangements. Here the roller 135 in contact with the web is connected, as shown by the dashed lines, to the output control 154 to pivot it between output bins in response to the direction of web movement.

The face-up set collection bin 156 re-establishes forward serial order collation of a copy sheet set which was copied in reverse serial order direction on the document web. Upon the web reversal the output control is then switched to its dashed outline position as indicated by the small arrows. Thus, the next subsequent copy set, which is copied in forward serial order from all the documents, is placed face-down in the other bin 158 to maintain its forward serial order collation. For each web recirculation this cycle is repeated.

The use of two separate output bins or trays has another advantage in that the operator can remove completed copy sets from one bin while the next set is being fed into the other bin. However, it will be appreciated, as described for the FIG. 1 embodiment of the parent application, that a conventional inverter in series with a single output bin can be utilized for the output of a bi-directional copier. In that case the inverter is actuated for inverting the reverse serial order copy sets, but not the alternate forward serial order copy sets, if an otherwise face-down output tray is provided, or vice-versa if an otherwise face-up output tray is provided.

With either one or two bin output trays, a set jogger or off-setter is desirable, as previously noted. This provides easier operator separation and removal of the individual copy sets from the others accumulated in the bin or bins.

Also shown in FIG. 1 is an additional dashed line connection between the duplex sheet path deflector 160, the duplex tray sheet feeder 162, and the sheet output deflector unit 154. This schematically illustrates a further operative connection to, and control of, the output control 154 by the duplex control of the copier. As previously noted, it is known that with a duplexing system of this type that the copy sheets are already inverted in the duplexing path here. Thus, duplex (second face copied) copy sheets are already "face-down" (the first face is down) here as they enter the sheet output path, i.e., before they enter the output control 154. Thus, duplexed sheets are desirably placed in opposite bins from simplexed sheets, i.e., the positions of the output control 154 are reversed as compared to simplex output. Thus, forward serial order copied duplexed sheets are placed in the bin 156, where they will be effectively stacked face-down and maintained in forward serial order collation. It may be thus seen that the output control means 154 selecting between face-up and face-down output is preferably controlled by a simple logic or switching circuit connected to respond to both the selections between simplex and duplex copying and the selection between forward and reverse order document copying, in the manner described.

Referring now to the further embodiment 160 of FIG. 2, it has a web scroll document handling system orientation similar to that of FIG. 1, which therefore need not be discussed in detail other than to note that the documents are loaded therein behind the conventional stationary document copying platen 162. A fully automatic conventional document sheet separator and feeder 167 is shown for loading the documents from a stack automatically, when desired, into the web scroll document handling system. (This feature or attachment could also be provided for the other embodiments, if desired).

In this embodiment 160, the optics system for the platen 162 shares a lens unit 165 and the two mirrors of a mirror unit 166 with the optics system for the automatic web/scroll document handler from its imaging station 164. However, when it is desired to image a document on the platen 162, a mirror 168 is pivoted down into this optics path. The mirror 168 is the half-rate scanning mirror for the platen 162 in cooperation with the full-rate scanning mirror 170. The mirror 168 is illustrated in its "beginning-of-scan" position. The end of scan position for both the mirrors 168 and 170, and their optics paths from the platen 162 are illustrated by the dashed outline positions here. As previously noted, an appropriate optics system 165 provides for optical rotation of the image path to allow bi-directional scanning of the document web and also of the platen, if desired.

A copy sheet transport belt 172 is provided to carry the copies from one of the copy sheet trays through the transfer station engagement with the xerographic drum 174 and then through the fuser. This may be a vacuum or electrostatic belt system. Reference may be had to U.S. Pat. No. 3,832,053 issued Aug. 27, 1974, and the references cited therein by way of example.

Each copy sheet, upon exiting the transport belt 172, can be selectively deflected by a movable deflector 178 into a duplex sheet tray for later feeding back on the bottom flight of the transport belt 172 for the transfer of an image to the opposite side of the copy sheet. Otherwise, the copy sheet immediately exits through a further output transport including a sheet output deflector 180. The copy sheets are deposited in an upwardly opening V-shaped two-sided output tray area 182. The sheets enter an opening at the bottom, defined by the two converging walls, in which the deflector 180 is centrally positioned. The selected pivoted position of the output deflector 180 deflects the output sheet to either one side 184 or the other side 186 of the output tray 182. The two walls 184 and 186 are opposing and oppositely sloping from the vertical. This selects either "face-up" or "face-down" output sheet stacking by this selection between the two different output bins 184 and 186 into which the copy sheets are fed. Completed copy sets may be removed from one bin without interruption while sheets are being fed into the other bin to make up the next set. The deflector 180 is at the bottom of the V where the copy sheets enter.

The deflctor 180 is connected to respond to the direction of document web movement and also the operation of the duplexer through a switch 190. This operation is the same as that described above in connection with the embodiment 120 of FIG. 1 to provide the same described function.

It may be seen that there have been disclosed herein embodiments of an improved copying apparatus for making multiple pre-collated copy sheet sets with bidirectional copying. While the embodiments disclosed herein are presently considered to be preferred, it will be appreciated that numerous modifications and improvements may be made therein without departing from the true spirit and scope of the invention. The following claims are intended to encompass all such modifications and improvements as fall within the spirit and scope of the invention.

What is claimed is:

1. In a copying system in which document handling means are provided for recirculatingly moving a set of documents in serial sequential order past optical imaging means for pre-collated sequential copying of the documents onto the faces of individual copy sheets in sequential collated sets of said copy sheets, wherein guide means provide a copy sheet output path for said copy sheets, and wherein said document handling means and said optical imaging means are adapted to alternatingly recirculate said documents in forward serial order and then in reverse serial order relative to said optical imaging means to provide bi-directional pre-collated copying wherein the copy sheets of alternate copy sheet sets are alternately in forward and reverse serial order of collation, the improvement comprising:

- copy sheet collection means for collecting said collated copy sheet sets from said copy sheet output path; and
- copy sheet output control means for alternatingly switching said output path of said copy sheets to said copy sheet collection means in response to said alternation between said forward and reverse serial order of copying of said documents for inverting said copy sheets in said reverse serial order relative to said copy sheets in said forward serial order to establish forward serial order for both.

2. The copying system of claim 1, wherein said collation means comprises two copy sheet bin means and wherein said copy sheet output control means switches said copy sheet output path between said two bin means in response to said alternation between said forward and reverse serial order of copying of said documents.

3. The copying system of claim 1, further including duplexing means for copying said documents to both sides of said copy sheets, wherein said duplexing means is also connected to said copy sheet output control means to switch said output path of said copy sheets in response to said duplexing means.

4. The copying system of claim 1, wherein said optical imaging means comprises full-frame imaging means for producing copy sheets having the same document image orientation on each copy sheet for both said forward and reverse serial order of copying of said documents.

5. The copying system of claim 1, further including selectable duplex copying means for inverting said copy sheets and for copying a document image on both faces thereof; wherein said copy sheet output control means is switchable in response to the operation of said duplex copying means to maintain said forward serial collation of said copies in said copy sets in both said first and second set collection means for duplex copying.

6. The copying system of claim 1, wherein said copy sheet output control means comprises repositionable copy sheet deflector means in said output path to said copy sheet collection means providing face-down stacking of copy sheets from said forward serial order copying of said documents, and face-up stacking of copy sheets from said reverse serial order copy of documents.

7. The copying system of claim 6, wherein said copy sheet output control means comprises a selectively operable individual sheet inverter in said output path.

8. The copying system of claim 1, wherein said document handling means comprises:

- an elongated windable document holding web;
- means for forming a spaced pair of oppositely wound scrolls of said web for winding up a set of documents on said web therein and retaining said documents between turns of said web on both said web scrolls;
- said web having a minor intermediate unwound segment extending between said web scrolls;
- means for recirculatingly winding and unwinding said web between one said web scroll and the other said web scroll to recirculatingly expose individual documents on said intermediate segment of said web between said web scrolls in a pre-collated order;
- and wherein said optical imaging means images documents on said intermediate segment of said web between said web scrolls for copying said documents during both said winding and unwinding of said web.

9. The copying system of claim 8, wherein said intermediate segment is planar and larger than said documents and provides for substantially instantaneous full-frame imaging of said documents thereon by said optical imaging means.

10. In a copying system in which document handling means are provided for recirculatingly moving a set of documents in serial sequential order past optical imaging means for pre-collated sequential copying of the documents onto the faces of individual copy sheets in sequential collated sets of said copy sheets, wherein guide means provide a copy sheet output path for said copy sheets, and wherein said document handling means and said optical imaging means are adapted to alternatingly recirculate said documents in forward serial order and then in reverse serial order relative to said optical imaging means to provide bi-directional pre-collated copying whereby said copies for said copy sheet sets are alternately in forward and reverse serial order of collation for alternate sets, the improvement comprising:

first and second copy sheets collection means for collecting said collated copy sheet sets from said copy sheet output path; and copy sheet output control means for alternatingly switching said output path of said copy sheets between said first and second copy sheet collection means in response to said alternation between said forward and reverse serial order of copying of said documents, said first copy sheet collection means providing for face-up stacking of said copy sheets for re-establishing forward serial order collation thereof, and said second copy sheet collection means providing for face-down stacking of said copy sheets for maintaining forward serial collation thereof, cooperatively with said copy sheet output control means.

11. The copying system of claim 10, wherein said first and second copy sheet collection means are defined by two opposing and oppositely sloping walls of an upwardly opening generally V-shaped copy sheet bin means.

12. The copying system of claim 11, wherein said bin means has an opening at the bottom thereof defined by said opposing walls converging at said bottom opening; and wherein said copy sheet output control means comprises a movable copy sheet deflector positioned in said bottom opening and adapted to deflect copy sheets selectively to one or the other of said opposing walls.

13. The copying system of claim 10, further including duplexing means for copying said documents onto both sides of said copy sheets, wherein said duplexing means is also connected to said copy sheet output control means for alternately switching said output path of said duplexed copy sheets between said first and second copy sheet collection means in response to said duplexing means so that said first copy sheet collection means provides face-down stacking of said duplexed copy sheets and said second copy sheet collection means provides face-up stacking of said duplexed copy sheets.

14. The copying system of claim 10, wherein said copy sheet output control means comprises pivotal copy sheet deflector means in said copy sheet path to at least one of said first and second copy sheet collection means to deflect copy sheets into one or the other.

* * * * *